Nov. 7, 1967 S. B. HAMILTON, JR., ET AL 3,351,667
4-(4'-BROMO-2',6'-DIMETHYLPHENOXY)-2,6-DIMETHYLPHENOL AND
METHOD OF PREPARATION
Filed July 31, 1964

Concentration:
5.4 mg./g. KBr

Concentration:
8.5 mg./g. KBr

Concentration:
5.5 mg./g. KBr

Concentration:
5.1 mg./g. KBr

Inventors:
Stephen B. Hamilton, Jr.;
Harry S. Blanchard,
by James L. Underwood
Their Agent.

Nov. 7, 1967  S. B. HAMILTON, JR., ET AL  3,351,667
4-(4'-BROMO-2',6'-DIMETHYLPHENOXY)-2,6-DIMETHYLPHENOL AND
METHOD OF PREPARATION
Filed July 31, 1964
2 Sheets-Sheet 2

Concentration 5.8 mg./g. KBr

Concentration 5.9 mg./g. KBr

Concentration 5.6 mg./g. KBr

Inventors:
Stephen B. Hamilton, Jr.;
Harry S. Blanchard,
by
Their Agent.

United States Patent Office 3,351,667
Patented Nov. 7, 1967

3,351,667
4 - (4' - BROMO - 2',6' - DIMETHYLPHENOXY)-
2,6-DIMETHYLPHENOL AND METHOD OF
PREPARATION
Stephen B. Hamilton, Jr., and Harry S. Blanchard,
Schenectady, N.Y., assignors to General Electric
Company, a corporation of New York
Filed July 31, 1964, Ser. No. 386,699
7 Claims. (Cl. 260—613)

ABSTRACT OF THE DISCLOSURE

Bromination of 4 - (2',6' - dimethylphenoxy) - 2,6 - dimethylphenol or its methyl ether under nuclear brominating conditions with sufficient bromine to produce a dibrominated product followed by debromination with hydriodic acid removes only one of the bromine atoms and the methyl group, if the methyl ether is used, producing 4 - (4' - bromo - 2',6' - dimethylphenoxy) - 2,6 - dimethylphenol. This new chemical compound is useful for making derivatives thereof and also for preparing polyphenylene ethers.

Figure 1:
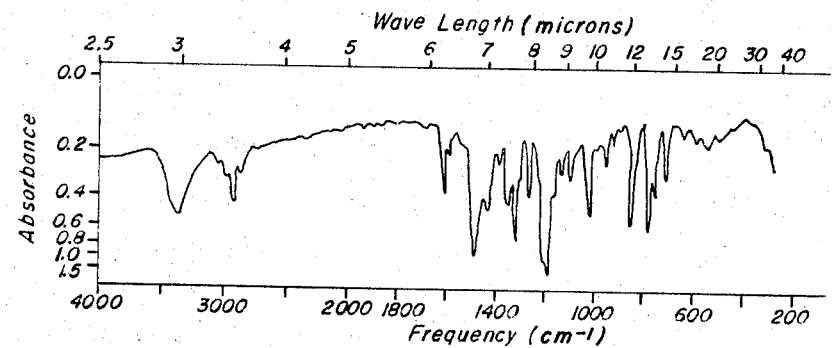

This invention relates to bromophenoxyphenols and to a process of producing the same. More particularly, this invention relates to 4-(4'-bromo-2',6'-dimethylphenoxy)-2,6-dimethylphenol, and to a process of producing the same.

FIGS. 1–7 are infrared spectra of the various phenoxyphenols described hereinafter.

Phenoxyphenols in which the phenoxy group is substituted in the para position of the phenol nucleus and especially those in which the two ortho positions of each benzene nucleus, i.e., the 2- and 6-position of each benzene nucleus, are substituted with halogen or methyl groups, have been of interest for a long period of time as starting materials for the production of thyroxine analogs; see for example, Bielig and Lützel, Ann., 608, 140 (1957), and Van Heyningen, J. Org. Chem., 26, 3850 (1961). These authors brominated various 2,2',6,6'-tetrasubstituted phenoxyphenols and assumed that the bromination occurred in the para position of the phenoxy group, but they did not definitely prove the structure of their resulting product. Their assumption was apparently based on the fact that bromination of the unsubstituted para position of phenols and phenol ethers occurs when such compounds have substituents in both ortho positions, but it overlooks the fact that the meta position can be brominated when there are substituents in the para and both ortho positions of such compounds.

Bielig and Lützel reacted the methyl ether of 4-(2',6'-dimethylphenoxy)-2,6-dimethylphenol with bromine in equimolar proportions in a cooled glacial acetic acid solution. They obtained a product having a melting point of 78–79° C. which analyzed correctly for carbon, hydrogen and bromine for the mono-brominated compound $C_{17}H_{19}O_2Br$, which they assumed was 3,5-dimethyl-4-(3', 5' - dimethyl - 4' - methoxyphenyl) - 1 - bromobenzene, i.e., the methyl ether of 4-(4'-bromo-2',6'-dimethylphenoxy)-2,6-dimethylphenol. However, they performed no experiments to prove the position of the bromine substituent.

Van Heyningen was interested in preparing 4-(4'-bromo-2',6'-dimethylphenoxy)-2,6-dimethylphenol. He repeated the preparation of Bielig and Lützel to prepare the methyl ether of the mono-bromo compound which had a melting point of 73.5° C., which agrees approximately with the melting point given by Bielig and Lützel. He gave no elemental analysis for his product and likewise gave no proof of the exact point of bromination of his compound. He did discover that when he attempted to convert the methyl ether into the free phenol by demethylation of the ether with hydriodic acid, not only was the methyl ether demethylated to the free phenol, but unexpectedly the compound was debrominated so that the product was 4-(2',6'-dimethylphenoxy)-2,6-dimethylphenol. He therefore brominated the free phenol with bromine in equimolar proportions in glacial acetic acid and obtained a mono-brominated product having a melting point of 101–103° C., but reported no bromine analysis for his product. However, his carbon and hydrogen analysis agreed very well with the theoretical analysis for the product $C_{16}H_{17}BrO_2$ which he assumed was 4-(4'-hydroxy-3',5' - dimethylphenoxy) - 3,5 - dimethylphenyl bromide, which alternatively is named 4-(4'-bromo-2',6'-dimethylphenoxy)-2,6-dimethylphenol. He attempted no proof of exactly which position was brominated in this reaction.

Since the successful preparation of thyroxine analogs is dependent upon introducing the bromine substituent in the para position of the phenoxy moiety of these phenols, it is necessary to definitely know which position is brominated. If the bromine is introduced into some other position of the ring, then the subsequent reactions, e.g., those shown by Bielig and Lützel and by Van Heyningen, would produce compounds other than the desired thyroxine analog. We have now conclusively proven by proton magnetic resonance spectroscopy (PMR), infrared spectroscopy and chemical reactions, that when 4-(2',6'-dimethylphenoxy)-2,6-dimethylphenol or its methyl ether is monobrominated with bromine, the reaction occurs exclusively at the meta position of the benzene ring containing the phenolic hydroxyl group or methyl ether group to produce 4-(2',6'-dimethylphenoxy)-3-bromo-2,6-dimethylphenol or its methyl ether. Such compounds would therefore not be intermediates for the preparation of thyroxine analogs.

When 4 - (2',6' - dimethylphenoxy) - 2,6 - dimethylphenol and its methyl ether are brominated by reacting them in the proportion of 1 mole of the phenol or its methyl ether to 2 moles of bromine, using the well known techniques for halogenation of the aryl nucleus, we have discovered that a dibrominated product is produced having the formula

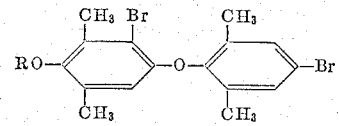

where R is hydrogen when the phenol is brominated and methyl when the methyl ether is brominated. In other words, one of the bromine atoms is introduced into the meta position of the benzene nucleus having the phenolic hydroxyl or methyl ether group the same as when the monobrominated product is produced, and the other bromine atom is introduced into the para position of the phenoxy moiety of the phenol or its methyl ether. Bromination of the latter position occurs so much slower than the bromination of the former position that the meta position is essentially completely brominated before the para position is brominated.

In carrying out the bromination reaction, the phenol or its methyl ether is dissolved in an inert solvent and the bromine introduced either in its elemental form as a gas or liquid, or as a solution in an inert solvent. The bromination reaction is generally carried out at or near ambient temperature and the bromine added gradually at a rate at which it is consumed in the bromination reaction. The reaction mixture is generally kept at or near ambient temperature by cooling and is generally carried out in the absence of ultraviolet light since the latter promotes bromination of the methyl groups of the phenol. Slight heating, i.e., to 34–45° C., of the solution at least toward the end of the reaction aids in more complete bromination of the para position. The inert solvent is preferably a polar solvent, but a non-polar solvent can be used. When a non-polar solvent is used, it is generally used in conjunction with a Lewis acid which is soluble in the solvent, for example, aluminum bromide, zinc bromide, etc. Since the use of a polar solvent eliminates the need for use of Lewis acids, we prefer to use a polar solvent, for example, a liquid, aliphatic carboxylic acid, e.g., acetic acid, propionic acid, butyric acid, etc., of which the most readily available and cheapest is acetic acid.

We have also discovered that when the dibrominated product is reacted with hydriodic acid, the bromine atom in the meta position is removed while the bromine atom in the para position is not, even though an excess of hydriodic acid is used. If the dibrominated compound is the ether, the methoxy group is converted at the same time to the hydroxyl group by the hydriodic acid. Therefore, whether the dibrominated product is the methyl ether or the phenol, the reaction with hydriodic acid produces 4-(4′-bromo-2′,6′-dimethylphenoxy)-2,6-dimethylphenol having the formula

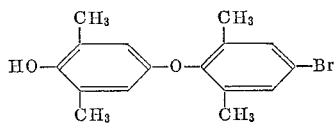

The reaction of the hydriodic acid with the dibrominated compound consumes 2 moles of hydriodic acid for each gram atom of bromine removed, and 1 mole of hydriodic acid for each gram atom of methoxyl group converted to hydroxyl group. Therefore, if the dibrominated compound is the dibromophenol, at least 2 moles of hydriodic acid should be used for each mole of the dibromophenol. If the dibrominated compound is the methyl ether, 3 moles of hydriodic acid should be used for each mole of the methyl ether of the dibromophenol, in order to insure complete conversion of the dibrominated compound to 4-(4′-bromo-2′,6′-dimethylphenoxy)-2,6-dimethylphenol. An excess of hydriodic acid can be used, since as explained above, excess hydriodic acid does not remove the bromine in the para or 4′ position. The reaction of the hydriodic acid with the dibrominated compound occurs readily at room temperature, but may be hastened by heating the solution at any temperature up to the reflux temperature of the mixture. Care should be taken not to distill the hydriodic acid, which forms a constant boiling azeotrope with water boiling at 127° C., from the reaction mixture. Since hydriodic acid is commercially available as an aqueous solution, the reaction is generally carried out in an inert solvent which will dissolve the disbrominated compound and the aqueous solution of hydriodic acid. The liquid aliphatic carboxylic acids are ideal solvents to use, for example, acetic acid, propionic acid, butyric acid, etc. Since acetic acid is the cheapest and most readily available, it is the preferred solvent. If the bromination reaction is carried out in the same solvent, especially acetic acid, the reaction with hydriodic acid can be carried out without necessity of isolating the dibrominated product.

The reaction of hydriodic acid with the methoxyl group to convert it to the hydroxyl group produces methyl iodide, which is a liquid boiling at 42.4° C. It can conveniently be removed from the reaction mixture by heating the reaction mixture to a temperature above the boiling point of methyl iodide and letting it distill from the reaction mixture, or since it is a liquid, it may be left in the reaction mixture if desired.

The reaction of hydriodic acid with the dibrominated compound to remove the bromine substituent in the meta position produces free iodine. This may be removed most readily by reaction with a compound which forms a stable iodine compound, for example, sodium bisulfite, etc. The desired 4-(4′-bromo-2′,6′-dimethylphenoxy)-2,6-dimethylphenol is recovered from the reaction mixture most conveniently by adding a liquid in which the product is not soluble, but the balance of the reaction mixture is soluble. The most convenient material to use is water, especially when a liquid aliphatic carboxylic acid is used as the reaction solvent. If it is desired to simultaneously remove the iodine, the water used to precipitate the product can contain dissolved therein the sodium bisulfite, or other reagent capable of forming a stable iodine compound soluble in the liquid phase. The precipitated 4-(4′-bromo-2′,6′-dimethylphenoxy)-2,6-dimethylphenol is removed from the balance of the reaction mixture, for example by filtration or centrifugation, etc., and may be purified by recrystallization, distillation, etc.

In order that those skilled in the art may better understand our invention, the following examples are given by way of illustration and not by way of limitation. In all of the examples, the percentages are by weight, unless otherwise stated.

To provide a proper basis for understanding the significance of the PMR spectra reported in the examples, it should be kept in mind that a theoretical PMR spectrum consists of a set of lines, each line corresponding to one or more protons (combined hydrogen in the compound) in a particular magnetic environment. This permits the differentiation between protons which exist in different magnetic environments in a chemical compound. The positions of the lines are related to the nature of the magnetic environments and are commonly reported in tau units [L. M. Jackman, Nuclear Magnetic Resonance Spectroscopy, Pergamon Press, New York (1959) pages 46–47]. Differences in line positions for protons in different magnetic environments are called chemical shifts. In observed PMR spectra, the theoretical lines appear as Lorentzian curves, commonly referred to as peaks. The areas under the curves are proportional to the number of magnetically equivalent protons of a given type.

When the magnetically different protons are sufficiently remote from one another, spin-spin interaction is negligible and each proton or set of magnetically equivalent protons gives rise to a single line the intensity of which is proportional to the number of magnetically equivalent protons. Nuclei, including protons, whose spins interact are called spin-coupled nuclei. The spectrum of a compound having protons spin-coupled to other nuclei will show more than one line for each magnetically different proton (J. D. Roberts, An Introduction to Spin-Spin Splitting in High Resolution Nuclear Magnetic Resonance Spectra, W. A. Benjamin, Inc., New York, 1962). The theory of spin-spin interactions is such that it is possible either to predict the numbers and intensities of lines for a given set of protons or to determine the arrangements of protons in molecules from the observed numbers, spacings and intensities of lines. If several non-equivalent protons are spin-coupled to one another, or if the magnitudes of the spin-couplings and chemical shifts are comparable, involved calculations may be required to interpret the observed pattern of lines. However, in a great many cases, including all those discussed below, simple, well-known rules provide a sufficient guide for interpreting experimental spectra or predicting theoretical spectra.

All infrared spectra were obtained using the KBr pellet technique.

*Example 1*

A solution of 6.4 g. (0.04 mole) of bromine in 20 ml. of glacial acetic acid was added dropwise to a solution of 9.68 g. (0.04 mole) of 4-(2′,6′-dimethylphenoxy)-2,6-dimethylphenol in 80 ml. of glacial acetic acid at room temperature. The solution was stirred for 40 minutes by which time the evolution of hydrogen bromide appeared complete. The reaction mixture was poured into water containing a few grams of sodium bisulfite. A solid precipitate was formed which was filtered from the solution and dried. It had a melting point of 101–103° C., which agrees with the melting point reported by Van Heyningen. The yield of product was 12.5 g., which is 95% of theoretical for a monobrominated compound. Elemental analysis showed that it contained 59.5% C, 5.5% H, and 24.3% Br, which agrees very well with the theoretical values for $C_{16}H_{17}O_2Br$ of 59.8% C, 5.3% H, 24.9% Br.

The proton magnetic resonance spectra of the unbrominated and brominated compounds were obtained in deuterochloroform ($CDCl_3$) solution at 40 megacycles. The positions of the peaks in tau units ($\tau$) and the relative values of the areas under the peaks are shown in Table I. The relative values (R.V.) are the ratios obtained by dividing the total area under each of the peaks by the total area corresponding to a single proton.

TABLE I

| Peak | $\tau$ | R.V. | Interpretation |
|---|---|---|---|
| Unbrominated Compound | | | |
| 1 | 3.05 | 3 | 3 magnetically equivalent aromatic protons. |
| 2 | 3.75 | 2 | 2 magnetically equivalent aromatic protons. |
| 3 | 5.93 | 1 | 1 OH proton. |
| 4 | 7.95 | 12 | 12 magnetically equivalent aliphatic protons (4 magnetically equivalent $CH_3$-). |
| Brominated Compound | | | |
| 1 | 3.05 | 3 | 3 magnetically equivalent aromatic protons. |
| 2 | 4.10 | 1 | 1 aromatic proton. |
| 3 | 5.60 | 1 | 1 OH proton. |
| 4 | 7.70 | 3 | 3 magnetically equivalent aliphatic protons (1 $CH_3$-). |
| 5 | 7.97 | 6 | 6 magnetically equivalent aliphatic protons (2 magnetically equivalent $CH_3$-). |
| 6 | 8.05 | 3 | 3 magnetically equivalent aliphatic protons (1 $CH_3$-). |

The structural formulae of the starting material and the three possible monobromo compounds are:

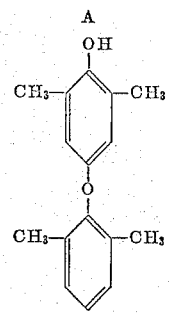

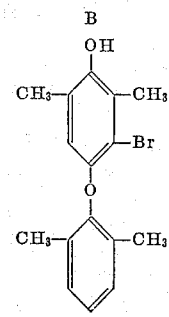

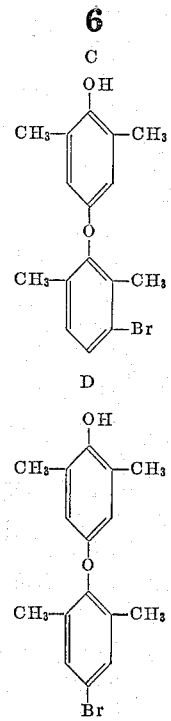

The PMR spectrum of the unbrominated compound A shows that the twelve aliphatic protons are magnetically equivalent and therefore absorb at the same frequency, so that the peak area is twelve times as great as the peak area from a single proton. This shows that there are four methyl groups which are magnetically equivalent to each other. Extensive investigations reported in the literature show that the peaks of protons of methyl groups attached to phenyl rings occur in the region above 7 tau, whereas the peaks of protons on phenyl rings occur in the region below 5 tau. The single peak at 7.95 tau which is characteristic of the methyl protons in the unbrominated compound is split into three peaks shifted to tau values of 7.70, 7.97 and 8.05, with relative values of 3, 6 and 3, respectively, in the spectrum for the monobrominated compound. This shows that there are four methyl groups, two of which are magnetically equivalent to each other, and two, each of which is magnetically non-equivalent to any of the others. This shifting of the peaks is caused by the bromine substituent. The methyl group which is nearest the bromine substituent will be the one whose peak is shifted the most. Such an effect would be characteristic of bromination of compound A if it formed compounds B or C, but not if it formed compound D. Because of the position of the bromine and its equal influence on the magnetic environment of the two nearest methyl groups, compound D would show two peaks in the region 7.0–8.5 tau, each of relative value 6, characteristic of two pairs of methyl groups with the methyl groups of each pair being magnetically equivalent to each other, but not to the methyl groups of the other pair. This evidence alone rules out the possibility that the monobrominated compound is compound D.

In the spectrum for the unbrominated compound A, the peak for the three magnetically equivalent aromatic protons at 3.05 tau, can only be due to the three aromatic protons (one in each of the two meta positions and one in the para position) in the bottom ring (phenoxy moiety) of compound A. The peak for the two magnetically equivalent aromatic protons, at 3.75 tau, can only be due to the two aromatic protons (one in each of the meta positions) of the upper ring (phenol moiety) of compound A. The fact that the peak at 3.05 tau in the spectrum of the unbrominated compound remains unchanged as to area and position in the spectrum of the brominated compound shows that the three aromatic protons of the phenoxy moiety of the starting material have not been affected by bromination. The fact that the peak at 3.75 tau has been reduced to one-half of its former area and has been shifted to 4.10 tau shows that one of the two aromatic protons of the phenol moiety has been removed by bromination and that the remaining aromatic proton is in a substantially different magnetic environment from that in the starting material. Such a PMR spectrum requires that the bromine substitution occurred at the meta position of the phenol moiety to produce compound B.

If the bromine substitution occurred as shown in Formula C, the PMR spectrum would have five peaks due to aromatic protons; a group of four peaks of total relative value 2, consisting of a symmetrical pair of doublets characteristic of two adjacent, magnetically non-equivalent, spin-coupled protons in the meta and para position of the phenoxy moiety, and a fifth peak of relative value 2, characteristic of two magnetically equivalent aromatic protons in the two meta positions of the phenol moiety, not equivalent to and not spin-coupled to the first two protons. The fact that the PMR spectrum does not show such peaks conclusively proves that the bromination has not occurred at the meta position of the phenoxy moiety and, therefore, the compound is not that shown by Formula C.

If the bromine substitution has occurred as shown in Formula D, the PMR spectrum would have two peaks, each of relative value 2, due to two pairs of aromatic protons, the two protons of each pair being magnetically equivalent to each other but not to the two protons of the other pair. The facts that the PMR spectrum of the monobrominated compound fails to show the peaks assignable to aromatic protons which are characteristic of compound D, and, as discussed above, also shows three peaks of assignable to methyl protons instead of two peaks characteristic of compound D, conclusively proves that the bromination has not occurred at the para position of the phenoxy moiety and, therefore, the compound is not that shown by Formula D.

Figure 2:
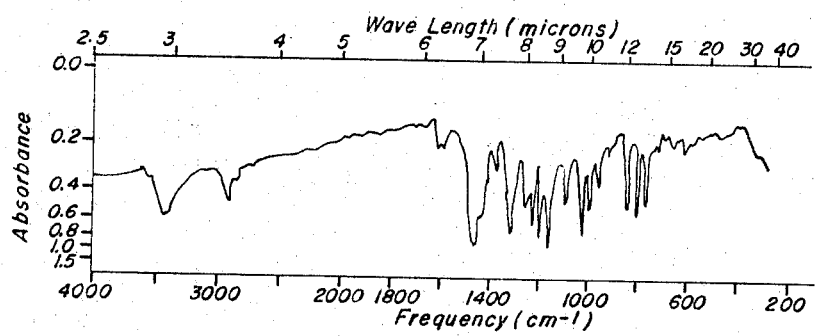

FIGS. 1 and 2 are the infrared spectra of the starting material and the monobrominated compound, respectively. Both spectra show the absorption band at 2.9–3.0 microns characteristic of the OH group.

Further evidence of the selection of Formula B as the structure of the monobromo compound is found in the fact that the infrared spectra of both the brominated and unbrominated compounds show the same characteristic absorption band for three hydrogens adjacent to each other in an aromatic ring at 9.1–9.2 microns. (The Infrared Spectra of Complex Molecules, L. J. Bellamy, Methuen & Co., Ltd., London, 2nd edition, 1958, p. 82.) Furthermore, when the brominated compound was polymerized to a polyphenylene ether, in a reaction in which the mechanism of growth of the polymer chain removes halogen from the para position if it is present on the phenoxy moiety as it is in Formula D [see Blanchard et al., J. Polymer Sci., 58, 469–490 (1962)], it was found that the polymer had been formed without loss of bromine since it contained 25.1 percent bromine compared to a theoretical value of 25.0 percent if no bromine had been removed in the polymerization reaction. All of this evidence therefore shows conclusively that the bromination has occurred in the meta position of the phenyl group bearing the phenolic hydroxyl group and that the product is 4-(2′,6′-dimethylphenoxy) - 3 - bromo - 2,6 - dimethylphenol.

When the bromination reaction was repeated using carbon tetrachloride and carbon disulfide as solvents in place of acetic acid, the product in each case was identical with that obtained above. Both products had the same infrared spectrum as obtained for the product described above and shown in FIG. 2. The particular solvent used does not influence the position which is brominated.

Example 2

A solution of 3.2 g. (0.02 mole) of bromine in 10 ml. of glacial acetic acid was added dropwise to a solution of 5.0 g. (0.0196 mole) of 4-(2′,6′-dimethylphenoxy)-2,6-dimethylanisole (the methyl ether of the compound of Example 1) in 20 ml. of acetic acid which had been cooled to 15° C. After the addition of the bromine was complete, the mixture was allowed to stand at room temperature for 12 hours. During this period, 0.8 g. of a solid precipitated having a melting point of 76–77° C. The reaction mixture was poured into water providing a further yield of 5.5 g. of a solid melting at 71–75° C., which indicates that it is the same product having a melting point reported by Bielig and Lützel of 78–79° C. Elemental analysis showed that it contained 61.2% C, 5.5% H, and 22.9% Br, which agrees very well with the theoretical values for $C_{17}H_{19}O_2Br$ of 60.9% C, 5.7% H and 23.8% Br.

The proton magnetic resonance spectra of the unbrominated starting material and the monobrominated product were obtained as described in Example 1. The position of the peaks in tau units and the relative values of areas under the peaks are shown in Table II.

TABLE II

| Peak | τ | R.V. | Interpretation |
|---|---|---|---|
| Unbrominated Compound ||||
| 1 | 3.03 | 3 | 3 magnetically equivalent aromatic protons. |
| 2 | 3.74 | 2 | 2 magnetically equivalent aromatic protons. |
| 3 | 6.46 | 3 | 3 magnetically equivalent methoxyl protons. |
| 4 | 7.84 | 6 | 6 magnetically equivalent aliphatic protons (2 magnetically equivalent ($CH_3$-). |
| 5 | 7.93 | 6 | Do. |
| Brominated Compound ||||
| 1 | 3.05 | 3 | 3 magnetically equivalent aromatic protons. |
| 2 | 3.95 | 1 | 1 aromatic proton. |
| 3 | 6.48 | 3 | 3 magnetically equivalent methoxyl protons. |
| 4 | 7.70 | 3 | 3 magnetically equivalent aliphatic protons (1 $CH_3$-). |
| 5 | 7.95 | 9 | 9 magnetically equivalent aliphatic protons (3 magnetically equivalent $CH_3$-). |

The structural formulae of the starting material and the three possible monobromo compounds are:

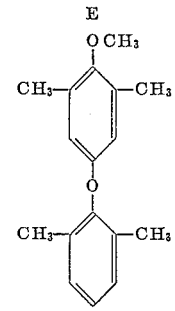

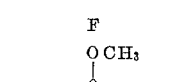

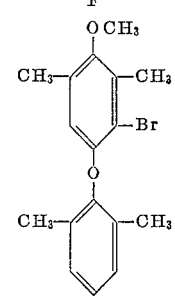

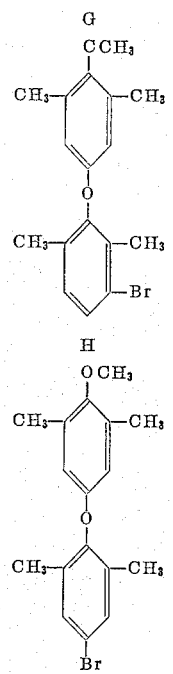

The PMR of the unbrominated compound E shows that there are two groups of six aliphatic protons with the protons of each group being magnetically equivalent to each other, but not magnetically equivalent to the protons of the other group, so that there are two peaks each of relative value 6. This shows that there are two pairs of methyl groups with the methyl groups of each pair being magnetically equivalent to each other, but not to the methyl groups of the other pair. In the PMR spectrum of the monobrominated compound, these two peaks at 7.84 and 7.93 tau, both of relative value 6, become two peaks shifted to tau values of 7.70 and 7.95, with relative values of 3 and 9, respectively. This shows that there are four methyl groups, three of which are magnetically equivalent to each other, and one which is magnetically non-equivalent to the other three. As explained in Example 1, this shifting of the peaks is caused by the bromine substituent, with the peak of the methyl group which is nearest the bromine substituent being the one which is shifted the most.

The fact that the peak of one methyl group is shifted so that it is magnetically equivalent to two of the other methyl groups is coincidental. Higher resolution under a stronger magnetic field might be capable of demonstrating a slight magnetic non-equivalence of one of the three methyl groups. The change in relative values which is observed for the methyl peaks would be characteristic of bromination of compound E if it formed compounds F or G, but not if it formed compound H. Because of the position of the bromine and its equal influence on the magnetic environment of the two nearest methyl groups, the compound H would show two peaks, as does the starting material, in the region 7.00–8.5 tau, each of relative value 6, characteristic of two pairs of methyl groups with the methyl groups of each pair being magnetically equivalent to each other, but not to the methyl groups of the other pair.

In the PMR spectrum for the unbrominated compound E, the peak for the three magnetically equivalent aromatic protons at 3.03 tau, can only be due to the three aromatic protons (one in each of the two meta positions and one in the para position) in the lower ring of compound E. The peak for the two magnetically equivalent aromatic protons at 3.74 can only be due to the two aromatic protons (one in each of the two meta positions) of the upper ring of compound E. The fact that the peak at 3.03 tau in the spectrum of the unbrominated compound remains unchanged as to area and has shifted only 0.02 tau unit in position in the spectrum of the brominated compound shows that the three aromatic protons in the lower ring of the starting material have not been affected by the bromination. The fact that the peak at 3.74 tau has been reduced to one-half its former area and shifted to 3.95 tau shows that one of the two aromatic protons in the upper ring of compound E has been removed by bromination and that the remaining aromatic proton is in a substantially different magnetic environment from that in the starting material. Such a PMR spectrum requires that the bromine substitution has occurred in the meta position of the upper ring of compound E.

If the bromine substitution has occurred as shown in Formula G, the PMR spectrum would have five peaks due to the aromatic protons; a group of four peaks of total relative value 2, consisting of a symmetrical pair of doublets characteristic of two adjacent, magnetically non-equivalent, spin-coupled protons in the meta and para position in the lower ring, and a fifth peak of relative value 2, characteristic of two magnetically equivalent, aromatic protons in the two meta positions of the upper ring, not equivalent to and not spin-coupled to the first two protons. The fact that the PMR spectrum does not show such peaks conclusively proves that the bromination has not occurred at the meta position in the lower ring and therefore the compound is not that shown by Formula G.

If the bromine substitution has occurred as shown in Formula H, the PMR spectrum would have two peaks, each of relative value 2, due to two pairs of aromatic protons, the two protons of each pair being magnetically equivalent to each other, but not to the two protons of the other pair. The facts that the PMR spectrum of the monobrominated compound fails to show the peaks assignable to aromatic protons which are characteristic of compound H and, as discussed above, also shows two peaks of relative values 3 and 9 assignable to the methyl proton instead of two peaks each of relative value 6 characteristic of compound H conclusively proves that the bromination has not occurred at the para position of the lower ring and therefore the compound is not that shown by Formula H.

Figure 3:
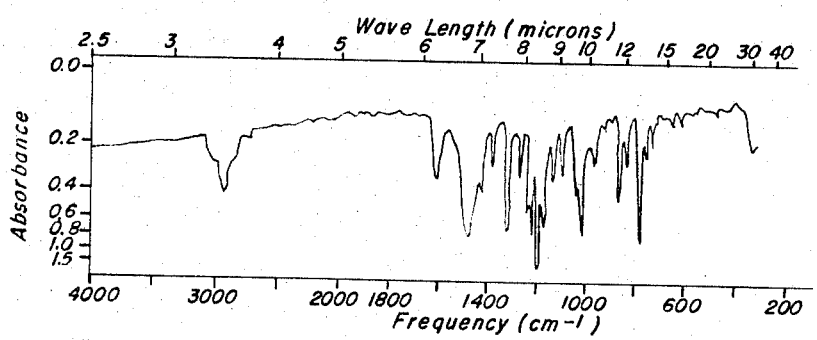
Figure 4:
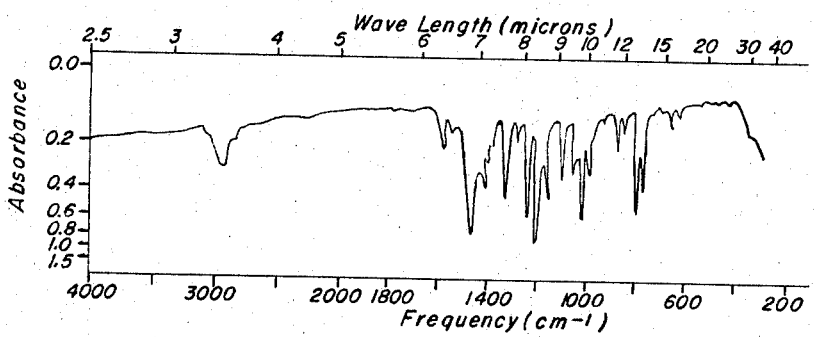

FIGS. 3 and 4 are the infrared spectra of the starting material and the monobrominated compound, respectively. The absorption band at 2.9–3.0 microns, characteristic of the OH group, is absent from both spectra. Further evidence of the selection of Formula F is found in the fact that the infrared spectra of both the brominated and unbrominated compounds show the same characteristic absorption band for three hydrogens adjacent to each other in an aromatic ring at 9.1–9.2 microns as do the compounds of Example 1.

All of this evidence shows conclusively that the bromination has occurred in the meta position of the phenyl group bearing the methoxyl group and that the product is 4-(2',6'-dimethylphenoxy)-3-bromo-2,6 - dimethylanisole. The replacement of the hydrogen of the hydroxyl group of the starting material of Example 1 by the methyl group to form the methyl ether, the starting material of Example 2, therefore, has not influenced the position which has been brominated.

*Example 3*

The dibromo derivative of the starting material of Example 1 was made by adding a solution of 6.4 g. (0.04 mole) of bromine in 20 ml. of acetic acid to a solution of 4.82 g. (0.02 mole) of 4-(2',6'-dimethylphenoxy)-2,6-dimethylphenol dissolved in 20 ml. of glacial acetic acid at room temperature. The solution was stirred for 24 hours at room temperature. The reaction mixture was poured into water to precipitate the product. After recrystallization from pentane, the yield was 2.9 g. of a compound melting at 131–133° C., which is 37% of theoretical for a dibrominated compound. Elemental analysis showed that it contained 48.6% C, 4.1% H, and 39.3% Br, which agrees very well with the theoretical values for $C_{16}H_{16}O_2Br_2$ of 48.1% C, 4.03% H, and 39.8% Br.

The proton magnetic resonance spectrum of the brominated compound was obtained as described in Example 1, with the pertinent data obtained listed in Table III.

TABLE III

| Peak | τ | R.V. | Interpretation |
|---|---|---|---|
| 1 | 2.95 | 2 | 2 magnetically equivalent aromatic protons. |
| 2 | 4.17 | 1 | 1 aromatic proton. |
| 3 | 5.74 | 1 | 1 OH proton. |
| 4 | 7.65 | 3 | 3 magnetically equivalent aliphatic protons (1 $CH_3$-). |
| 5 | 7.99 | 9 | 9 magnetically equivalent aliphatic protons (3 magnetically equivalent $CH_3$-). |

The structural formulae of the 5 possible dibromo compounds are:

I
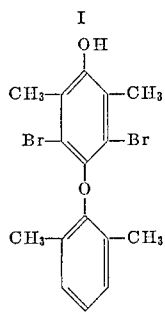

J
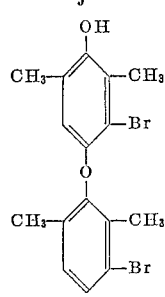

K
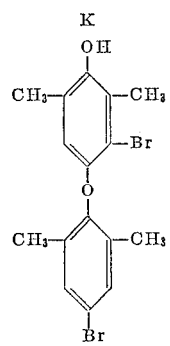

L
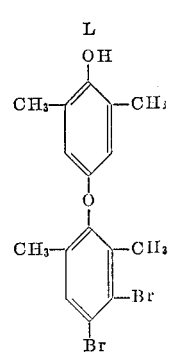

M
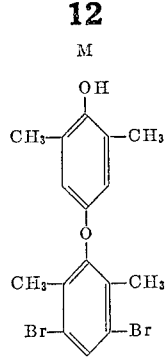

Compounds L and M actually are eliminated from consideration in view of the fact that they would require that the dibromination reaction occur in an entirely different manner than monobromination reaction of Examples 1 and 2, which have already conclusively proven that the bromine first substitutes on the meta position of the upper phenyl ring bearing the hydroxyl or methoxyl group.

The single peak of relative value 12 at 7.95 tau, which is characteristic of the methyl protons in the unbrominated compound A, previously discussed, is split into two peaks shifted to tau values of 7.65 and 7.99, with relative values of 3 and 9, respectively in the spectrum of the dibrominated compound. This shows that there are four methyl groups, three of which are magnetically equivalent to each other, and one of which is magnetically non-equivalent to the other three in the dibrominated compound.

This effect could be characteristic of compounds K and L. Compounds M and I are eliminated from consideration as representing the structure of the dibromo compound, since the PMR spectrum of each of these compounds would show two peaks in the region 7.0–8.5 tau, each of relative value 6, characteristic of two pairs of methyl groups with the methyl groups of each pair being magnetically equivalent to each other, but not to the methyl groups of the other pair. If there were only two peaks in the methyl region of the PMR spectrum of compound J, it would be because the bromine substituents on each ring had the same quantitative effect on the shifts of the corresponding methyl groups on each ring and would require that the relative values of each peak be 6. If the effects of the bromines on the shifts of the methyl groups in compound J were unequal, there would be more than two peaks in the methyl region of the PMR spectrum of the compound. This evidence rules out the possibility that the dibrominated compound is compound J.

The fact that the peak of relative value 2 at 3.75 tau has been reduced by one-half to a relative value 1 and shifted to 4.17 tau is consistent with the same change noted in Examples 1 and 2, and shows that one bromine of the two has brominated the meta position of the phenol moiety as would be expected from Examples 1 and 2. The fact that the peak of relative value 3, at 3.05 tau in the spectrum of the unbrominated compound A has been reduced to two-thirds of its former area to a relative value of 2, and has been shifted to 2.95 tau in the spectrum of the dibrominated compound shows that one of the three aromatic protons in the phenoxy moiety has been removed by bromination and the two remaining aromatic protons are in a substantially different magnetic environment from that in its starting material, but are magnetically equivalent to each other. Such a change in PMR spectrum requires that the second bromine substitution has occured in the para position of the phenoxy moiety of the compound, leaving the two meta positions of the phenoxy moiety unsubstituted, thus conclusively proving that the dibromo compound is that shown in formula K.

Compound I requires that there would be three magnetically equivalent aromatic protons. Compound J would require that the PMR spectrum would have five peaks due to aromatic protons; a group of four peaks of total relative value 2, consisting of a symmetrical pair of doublets characteristic of two adjacent, magnetically nonequivalent, spin-coupled protons in the meta and para positions of the phenoxy moiety for the same reasons as described in Example 1. Compounds L and M would both require that the peak with relative value 3 at 3.05 tau of the starting material would be reduced to a relative value 1 and that, if shifted at all, the peak at 3.05 tau would be shifted to a lower tau value.

Figure 5:
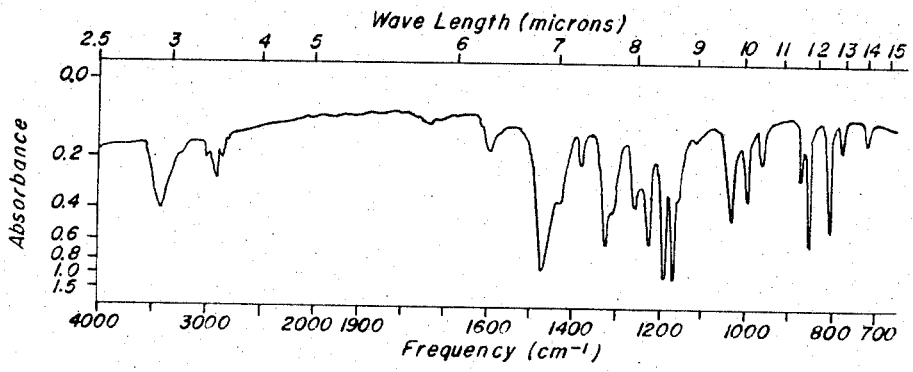

FIG. 5 shows the infrared spectrum of this dibrominated product. It shows the absorption band at 2.9–3.0 microns characteristic of the OH group and does not show the absorption band at 9.1–9.2 microns characteristic of three adjacent hydrogen adjacent to each other in an aromatic ring, thus further eliminating compound I.

All of this evidence, therefore, shows conclusively that one bromine atom has been introduced into the meta position of the phenyl group bearing the phenolic hydroxyl group and one bromine has been introduced into the para position of the phenoxy moiety and therefore the product is 4-(4'-bromo-2',6'-dimethylphenoxy)-3-bromo-2,6-dimethylphenol.

*Example 4*

The dibromo derivative of the compound of Example 2 was prepared by adding a solution of 6.4 g. (0.04 mole) of bromine in 20 ml. of glacial acetic acid dropwise to a solution of 5.12 g. (0.02 mole) of 4-(2',6'-dimethylphenoxy)-2,6-dimethylanisole in 20 ml. of acetic acid at 40° C. After the addition of bromine was complete, the mixture was allowed to stand with stirring for a period of 24 hours. The reaction mixture was poured into water to precipitate the reaction product. After recrystallization from acetic acid, a yield of 5.4 g., 65% of theory, of a dibromo compound was obtained having a melting point of 134–135° C. Elemental analysis showed that it contained 49.5% C, 4.5% H, and 38.1% Br, which agrees very well with the theoretical values for $C_{17}H_{18}O_2Br_2$ of 49.3% C, 44.4% H, and 38.6% Br.

The proton magnetic resonance spectrum of the dibrominated product was obtained as described in Example 1, with the pertinent data shown in Table IV.

TABLE IV

| Peak | $\tau$ | R.V. | Interpretation |
|---|---|---|---|
| 1 | 2.95 | 2 | 2 magnetically equivalent aromatic protons. |
| 2 | 4.13 | 1 | 1 aromatic proton. |
| 3 | 6.44 | 3 | 3 magnetically equivalent methoxy protons. |
| 4 | 7.65 | 3 | 3 magnetically equivalent aliphatic protons (1 $CH_3-$). |
| 5 | 7.93 | 9 | 9 magnetically equivalent aliphatic protons (3 magnetically equivalent ($CH_3-$). |

Since the PMR spectrum is almost the same as that obtained in Example 3 for the free phenol except that the peak for three magnetically equivalent methoxy protons has replaced the peak for the hydroxyl proton, as would be expected, the same reasoning as given in Example 3 applies to the product of Example 4.

Figure 6:
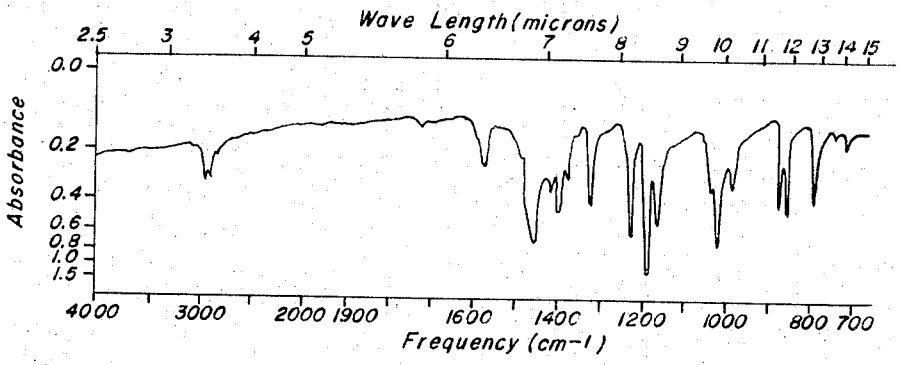

FIG. 6 shows the infrared spectrum of this dibrominated compound. Both the absorption band at 2.9–3.0 microns and the absorption band at 9.1–9.2 microns are absent showing the absence of the hydroxyl group and the absence of three adjacent hydrogens on an aromatic ring. All this evidence, therefore, again proves that one bromine atom has entered into the meta position of the phenyl ring bearing the methoxyl group, and one bromine has entered into the para position of the phenoxy moiety, and that therefore the compound is 4-(4'-bromo-2',6'-dimethylphenoxy)-3-bromo-2,6-dimethylanisole.

*Example 5*

The dibromo compound of Example 4 was demethylated and debrominated to the monobromophenol with hydriodic acid, as follows. A solution of 1.0 g. of the dibromo compound of Example 4 dissolved in 10 ml. of glacial acetic acid and 10 ml. of 57% aqueous solution of hydriodic acid was heated at reflux temperature (approximately 118° C.) for 2 hours. The reaction mixture was poured into water containing sodium bisulfite to precipitate the product and remove the free iodine. After recrystallization from hexane, 0.58 g. of product was obtained having a melting point of 132–134° C. Elemental analysis showed that it contained 60.0% C, 5.5% H, and 24.7% Br, which agrees very well with the theoretical values for $C_{16}H_{17}O_2Br$ of 59.8% C, 5.34% H, and 24.9% Br. The proton magnetic resonance spectrum of this monobrominated product was obtained as described in Example 1, with the pertinent data listed in Table V.

TABLE V

| Peak | $\tau$ | R.V. | Interpretation |
|---|---|---|---|
| 1 | 2.89 | 2 | 2 magnetically equivalent aromatic protons. |
| 2 | 3.73 | 2 | Do. |
| 3 | 5.80 | 1 | 1 OH proton. |
| 4 | 7.86 | 6 | 6 magnetically equivalent aliphatic protons (2 magnetically equivalent $CH_3-$). |
| 5 | 7.93 | 6 | Do. |

The structural formulae of the three possible monobromo compounds are those shown previously as compounds B, C and D in Example 1. It will be noted that the PMR spectrum of this monobromo compound is entirely different from that obtained in Example 1. As discussed in Example 1, the PMR spectrum of compound D would show two peaks in the region 7.0–8.5 tau, each of relative value 6, characteristic of two pairs of methyl groups, with the methyl groups of each pair being magnetically equivalent to each other, but not to the methyl groups of the other pair. It would also have two peaks, each of relative value 2, due to two pairs of aromatic protons, the two protons of each pair being magnetically equivalent to each other, but not to the two protons of the other pair. It will be noted that the PMR spectrum of the monobromo compound of this example shows such peaks and therefore it is conclusively proven that the monobromo compound is that represented by Formula D. The alternative Formulae B and C are eliminated because the PMR spectrum does not show the peaks required by those formulae as described in Example 1.

Figure 7:
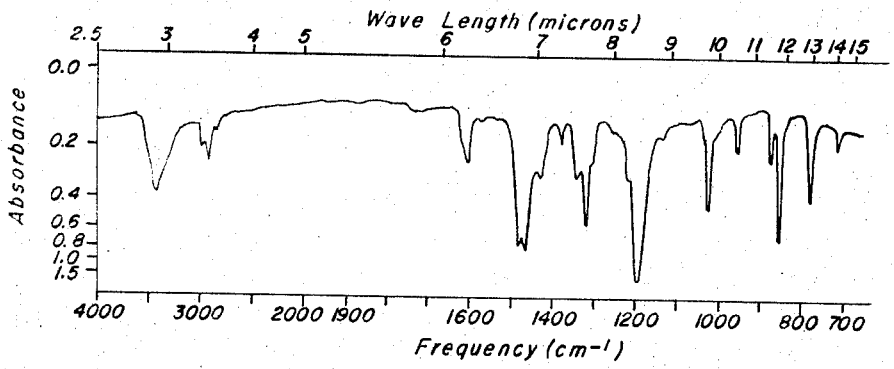

FIG. 7 shows the infrared spectrum of the debrominated product. It shows the absorption band at 2.9–3.0 microns characteristic of the OH groups and the absence of the absorption band at 9.1–9.2 microns characteristic of three adjacent hydrogens on an aromatic ring. This proves that the methoxyl group has been converted to the hydroxyl group and further rules out that the compound is compound B. It also proves that the compound definitely is not the same as is obtained in Example 1.

Further evidence that the compound is that shown by Formula D is found in the fact that when the compound is polymerized to a polyphenylene ether, as described in Example 1, the polymer purified by precipitation, contains no detectable bromine. All of this evidence therefore shows conclusively that the bromine remaining after the debromination reaction is in the para position of the phenoxy moiety and that the product is definitely 4-(4'-bromo-2',6'-dimethylphenoxy)-2,6-dimethylphenol.

*Example 6*

When 1.0 g. of the dibrominated product of Example 3 was debrominated with hydriodic acid as described in Example 5, a yield of 0.60 g. (75% of theory) of the monobromo compound was obtained. The product had an identical melting point of 132–134° C., and its infrared spectrum was identical with the monobromo compound of Example 5 (FIG. 7), showing that the product was definitely 4 - (4' - bromo - 2',6'-dimethylphenoxy)-2,6-dimethylphenol.

The product of this invention is useful in making thyroxin analogs, since it is conclusively proven as shown above that the bromine substituent is in the para position of the phenoxy moiety of the compound. The product may also be used in making polyphenylene ethers which are useful in making films, foils, and molded articles. Other uses of the product of this invention will be readily apparent to those skilled in the art.

Obviously, other modifications and variations of the present invention are possible in light of the above teachings. It is therefore to be understood that changes may be made in the particular embodiments of the invention described which are within the full intended scope of the invention, as described by the appended claims.

What we claim as new and desire to secure by Letters Patent of the United States is:

1. The process of making a monobromo-dimethyl-phenoxy-dimethylphenol which comprises reacting a compound having the formula

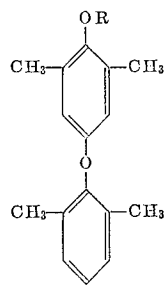

where R is selected from the group consisting of hydrogen and methyl, with sufficient bromine under nuclear brominating conditions to produce a dibrominated product, reacting the dibrominated product with hydriodic acid, and thereafter separating the monobromo-dimethyl-phenoxy-dimethylphenol from the reaction mixture.

2. The process of claim 1 wherein R is hydrogen.
3. The process of claim 1 wherein R is methyl.
4. The process of making 4-(4'-bromo-2',6'-dimethylphenoxy)-2,6-dimethylphenol which comprises reacting a compound having the formula

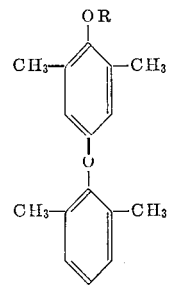

where R is selected from the group consisting of hydrogen and methyl, with sufficient bromine under nuclear brominating conditions to produce a dibrominated product, reacting the dibrominated product with hydriodic acid, and thereafter separating the 4-(4'-bromo-2',6'-dimethylphenoxy)-2,6-dimethylphenol from the reaction mixture.

5. The process of claim 4 wherein R is hydrogen.
6. The process of claim 4 wherein R is methyl.
7. 4-(4'-bromo-2',6'-dimethylphenoxy)-2,6-dimethylphenol.

References Cited

Bielig et al.: Justus Liebigs Annalen der Chemie, vol. 608, 1957), pp. 145, 155.

Heyningen, Journal Organic Chemistry, vol. 26 (1961), pp. 3850–3856.

BERNARD HELFIN, *Primary Examiner.*